United States Patent
Zhao et al.

(10) Patent No.: US 12,081,147 B2
(45) Date of Patent: Sep. 3, 2024

(54) METHOD FOR REDUCING ELECTROMAGNETIC VIBRATION OF PERMANENT MAGNET MOTOR WITH FRACTIONAL SLOT CONCENTRATED WINDING

(71) Applicant: Jiangsu University, Jiangsu (CN)

(72) Inventors: Wenxiang Zhao, Jiangsu (CN); Shengdao Zhu, Jiangsu (CN); Guohai Liu, Jiangsu (CN); Jinghua Ji, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 18/038,215

(22) PCT Filed: Mar. 2, 2021

(86) PCT No.: PCT/CN2021/078611
§ 371 (c)(1),
(2) Date: May 23, 2023

(87) PCT Pub. No.: WO2022/178909
PCT Pub. Date: Sep. 1, 2022

(65) Prior Publication Data
US 2024/0106360 A1 Mar. 28, 2024

(30) Foreign Application Priority Data
Feb. 24, 2021 (CN) .......................... 202110206198.9

(51) Int. Cl.
*H02K 29/03* (2006.01)
*H02K 1/16* (2006.01)
(Continued)

(52) U.S. Cl.
CPC ........... *H02P 21/05* (2013.01); *H02K 1/2766* (2013.01); *H02P 21/141* (2013.01); *H02K 2213/03* (2013.01); *H02P 21/0017* (2013.01)

(58) Field of Classification Search
CPC .... H02P 21/05; H02P 21/141; H02P 21/0017; H02K 1/2766; H02K 2213/03
(Continued)

(56) References Cited

U.S. PATENT DOCUMENTS

| | | | |
|---|---|---|---|
| 2009/0236930 A1* | 9/2009 | Nashiki | H02K 21/227 310/58 |
| 2013/0106227 A1 | 5/2013 | Aoyama | |

(Continued)

FOREIGN PATENT DOCUMENTS

| | | |
|---|---|---|
| CN | 102545436 | 7/2012 |
| CN | 107579606 | 1/2018 |

(Continued)

OTHER PUBLICATIONS

Mengmeng Wu, "Harmonic Analysis and Low Loss Design of FSCWs PM Motors Based on Magnetic Field Modulation", Chinese Selected Doctoral Dissertations and Master's Theses Full-Text Databases (Master), Science-Engineering (B), Nov. 15, 2019, pp. 1-85.

(Continued)

*Primary Examiner* — Gabriel Agared
(74) *Attorney, Agent, or Firm* — JCIPRNET

(57) ABSTRACT

The present disclosure provides a method for reducing the electromagnetic vibration of a fractional slot concentrated winding (FSCW) permanent magnet (PM) motor, which provides a guidance for the low vibration design of FSCW PM motor. The implementation of the method includes: Based on Nyquist Shannon sampling theorem, the modulation effect of electromagnetic force in the air gap is obtained, (Continued)

and the electromagnetic force component that contributes the most to the electromagnetic vibration of the FSCW PM motor is determined. The equivalent analytical model of PM flux density is established to obtain the phase relationship between different flux density harmonics. According to Maxwell stress equation, the internal relationship between each order of flux density harmonics and electromagnetic force harmonics is obtained. A new magnet structure of the PM motor is designed, and specific flux density harmonics are injected to reduce the electromagnetic force and electromagnetic vibration of the FSCW PM motor.

7 Claims, 8 Drawing Sheets

(51) Int. Cl.
  *H02K 1/276* (2022.01)
  *H02K 5/24* (2006.01)
  *H02P 21/05* (2006.01)
  *H02P 21/14* (2016.01)
  *H02P 21/00* (2016.01)

(58) Field of Classification Search
  USPC .......................................................... 318/702
  See application file for complete search history.

(56) References Cited

U.S. PATENT DOCUMENTS

| | | | |
|---|---|---|---|
| 2014/0346910 A1* | 11/2014 | Nakano | H02K 3/28 310/156.01 |
| 2017/0085138 A1* | 3/2017 | Nakano | H02K 3/28 |
| 2019/0229573 A1* | 7/2019 | Zhao | H02K 19/10 |
| 2020/0153290 A1* | 5/2020 | Xu | H02K 1/16 |

FOREIGN PATENT DOCUMENTS

| | | |
|---|---|---|
| CN | 107608934 | 1/2018 |
| CN | 207304179 | 5/2018 |
| CN | 108539935 | 9/2018 |
| CN | 109039215 | 12/2018 |
| CN | 109214125 | 1/2019 |
| CN | 110635598 | 12/2019 |

OTHER PUBLICATIONS

"International Search Report (Form PCT/ISA/210) of PCT/CN2021/078611", mailed on Nov. 16, 2021, with English translation thereof, pp. 1-5.

* cited by examiner (a)

(b)

(a)

(b)

(a)

(b)

(a)

(b)

(a)

(b)

METHOD FOR REDUCING ELECTROMAGNETIC VIBRATION OF PERMANENT MAGNET MOTOR WITH FRACTIONAL SLOT CONCENTRATED WINDING

CROSS-REFERENCE TO RELATED APPLICATION

This application is a 371 of international application of PCT application serial no. PCT/CN2021/078611, filed on Mar. 2, 2021, which claims the priority benefit of China application no. 202110206198.9, filed on Feb. 24, 2021. The entirety of each of the above mentioned patent applications is hereby incorporated by reference herein and made a part of this specification.

TECHNICAL FIELD

The present disclosure relates to a design and manufacture method of permanent magnet (PM) motors, and in particular, to a method for reducing the electromagnetic vibration of the fractional slot concentrated winding (FSCW) PM motor.

BACKGROUND

The FSCW PM motor has the advantages of high efficiency, high power density, wide speed range, low torque ripple and strong fault tolerance. It has been widely used in the fields of aerospace, electric vehicles, ship propulsion systems. With the development of PM motor industry, various applications put forward higher requirements on the performance of PM motor, and the electromagnetic vibration issue has received great attention from researchers. In particular, the FSCW PM motor has a special winding structure, and there are abundant magnetic field and electromagnetic force harmonic components in the air gap. The electromagnetic vibration problem of the FSCW PM motor seriously restricts its application in automobiles, household appliances, medical devices and other applications. Therefore, it is of great practical significance to study the electromagnetic vibration and its excitation source of PM motor for improving the comprehensive performance and product competitiveness.

Researchers have achieved some results in the research of vibration and noise reduction of PM motors. For example, in a patent application "Analysis Method for Vibration and Noise Sources of Electric Vehicle Permanent Magnet Synchronous Motor in Wide Range Speed Regulation" with application number of CN201810458703.7, it discloses an analysis method for vibration and noise sources of electric vehicle permanent magnet synchronous motor in wide range speed regulation, which accurately analyzes the vibration and noise of permanent magnet synchronous motor for vehicles, but this method is not applicable to FSCW PM motor with more abundant electromagnetic force harmonic components. In a patent application "A Stator Structure for Weakening the Vibration of Permanent Magnet Motor" with application number of CN201721087818.7, it discloses a new stator structure for weakening the vibration of PM motor, including: motor base, damping layer and stator core. The damping layer is arranged between the motor base and the stator core. This method blocks the vibration transmission path of the motor, rather than suppressing the vibration source of PM motor. In a patent application "Calculation Method of Electromagnetic Vibration Noise of a Motor" with application number of CN201811227208.1, it discloses a calculation method of electromagnetic vibration noise of a motor, but this method does not propose a vibration and noise suppression method of PM motor. In a patent application "A Fractional Slot Concentrated Winding Permanent Magnet Motor with Low Vibration and Noise Performance and Its Design Method" with application number of CN201710849041.1, it discloses a FSCW PM motor with low vibration and noise performance and its design method. On the basis of the original slot-pole combination, the design method correspondingly adds several additional stator teeth to effectively reduce the noise performance of the PM motor. However, this method increases the difficulty of motor manufacturing and greatly affects the output torque performance of the motor. In addition, this method is only applicable to specific slot-pole combination and winding type, so it is not a universal method.

SUMMARY

The purpose of the present disclosure is to provide a method for reducing the electromagnetic vibration of a FSCW PM motor. The present disclosure mainly includes deriving the mathematical expression of the electromagnetic force modulation effect of the PM motor based on the Nyquist Shannon sampling theorem. It mainly includes deriving the mathematical expression of electromagnetic force modulation effect of permanent magnet motor based on Nyquist Shannon sampling theorem; evaluating the electromagnetic force component that contributes the most to the FSCW PM motor; establishing the equivalent model of PM flux density, and is deducing the phase relationship between different magnetic flux density harmonics; according to Maxwell stress equation, getting the relationship between magnetic flux density harmonics and main electromagnetic force harmonics, and getting phase relationship between different electromagnetic force harmonics; designing a new magnet structure of the PM motor, and the magnetic flux density harmonic content in the PM motor is used to effectively reduce the electromagnetic force amplitude; and establishing a multi-physical electromagnetic vibration simulation model to verify the electromagnetic vibration suppression effect of the PM motor. On the premise of not increasing the processing difficulty and cost, an effective scheme to reduce the electromagnetic vibration of PM motor by using magnetic field harmonics is proposed.

Technical solution: In order to realize the purpose of the present disclosure, the technical solution adopted by the present disclosure is as follows:

The present disclosure provides a method for reducing the electromagnetic vibration of a FSCW PM motor, which includes the following steps:

The present disclosure provides a method for reducing the electromagnetic vibration of a FSCW PM motor, which includes the following steps:

Step 1. Based on Nyquist Shannon sampling theorem, the mathematical expression of electromagnetic force modulation effect of permanent magnet motor is derived.

Step 2. The electromagnetic force component that contributes the most to the FSCW PM motor is evaluated.

Step 3. The equivalent model of PM flux density is established, and the phase relationship between different harmonics of flux density is deduced.

Step 4. According to Maxwell stress equation, the relationship between flux density harmonics and main electromagnetic force harmonics is obtained, and the phase relationship between electromagnetic force harmonics is obtained.

Step 5. The new magnet structure of the PM motor is designed, and the harmonic content of the flux density in the PM motor is used to effectively reduce the amplitude of the resultant electromagnetic force.

Step 6. A multi-physical field electromagnetic vibration simulation model is established to verify the electromagnetic vibration suppression effect of the PM motor.

Furthermore, in step 1, the mathematical expression of the radial force modulation effect of the PM motor is derived according to the Nyquist Shannon sampling theorem. First, Fourier transform is performed on the air gap radial force density harmonic, and then Fourier decomposition is performed on the sampled signal. The output signal of the modulated radial force density can be expressed as the multiplication of the radial force density and the sampled signal, and the modulated radial force density can be expressed by using the frequency domain convolution theorem. According to the Nyquist Shannon sampling theorem, when the spatial order of the radial electromagnetic force is greater than half of the number of stator teeth, the spatial order of the radial electromagnetic force will change, and the high order electromagnetic force can be modulated into the low order electromagnetic force component.

Furthermore, in step 2, the motor stator is equivalent to a cylinder structure, and the mathematical relationship between the vibration displacement of the PM motor and the spatial order of the electromagnetic force can be obtained. When the spatial order of the electromagnetic force $v \geq 2$, the vibration displacement of the equivalent cylinder is approximately inversely proportional to the fourth power of the spatial order of the electromagnetic force. Therefore, the influence of electromagnetic force with higher spatial order on vibration is usually ignored. According to the relevant conclusion of claim 2, high-order electromagnetic force harmonics can be modulated into lower order electromagnetic force components. The contribution of electromagnetic force harmonics with small amplitude and low order and with large amplitude and high order to motor vibration are compared.

Furthermore, in step 3, the PM flux density waveform is approximately equivalent to a square wave signal to obtain the spatial order of the flux density harmonics and the corresponding phase angle. Since the square wave signal satisfies Dirichlet condition, Fourier coefficient of square wave signal can be obtained. As a consequence, the spatial order and the corresponding phase angle of the PM radial flux density harmonics can be obtained. Since the phase angle of the PM radial flux density harmonic is $\pi/2$ rad ahead of the tangential flux density harmonic, the spatial order and phase angle of the PM tangential flux density harmonic can be obtained. According to Fourier coefficient of square wave signal, the phase relationship between different PM flux density harmonics is obtained.

Furthermore, in step 4, the phase relationship between the main electromagnetic force harmonic components is obtained, and the relationship between the magnetic flux density harmonics and main electromagnetic force harmonics are obtained. According to Maxwell stress tensor method, the mathematical relationship between radial and tangential electromagnetic force and radial and tangential flux density harmonics can be expressed. Since the flux density is a function with time and space as variables, the electromagnetic force harmonics have a specific spatial order, frequency and initial phase angle. The electromagnetic force harmonics with the same spatial order and frequency have different initial phase angles, so there is superposition or cancellation between these electromagnetic force harmonics. According to Maxwell tensor method, the relationship between flux density harmonics and main electromagnetic force harmonics, as well as the phase relationship between different electromagnetic force harmonics can be obtained.

Furthermore, in step 5, the new magnet structure of the PM motor is designed, and the amplitude of the radial force is reduced by using the flux density harmonics in the PM motor. According to claim 5, there is phase superposition or cancellation between electromagnetic force harmonics. By analyzing the flux density harmonic source of the electromagnetic force component that plays the role of counteraction, each magnet is divided into three sections, and the remanence of the PM material at both ends is higher than that in the middle, so as to achieve the effect of flux density harmonic injection. The electromagnetic force generated by the injected PM flux density harmonics counteract the electromagnetic force generated by the fundamental flux density, so as to reduce the resultant electromagnetic force and electromagnetic vibration.

Furthermore, in step 6, a multi-physical field electromagnetic vibration simulation model is established to verify the electromagnetic vibration suppression effect of the PM motor. Two kinds of field numerical calculation software (i.e., Flux and LMS Virtual. Lab Acoustics) will be used cooperatively to carry out the simulation of electromagnetic vibration and noise of the PM motor. Flux is an excellent electromagnetic finite element simulation software for motor, which has the characteristics of convenient modeling, fast simulation speed and good adaptive subdivision effect. The modeling efficiency and the simulation accuracy are relatively high. After setting various parameters of the optimized FSCW PM motor in Flux, the force vector data derived from it can be connected with the vibration and noise simulation software LMS Virtual Lab Acoustics. LMS Virtual. Lab Acoustics can directly use CATIA, CAD and other models, and the geometric format is completely consistent. From the analysis of radial electromagnetic force and vibration mode of the motor, the electromagnetic analysis and three-dimensional structural dynamics simulation model of the PM motor are established. The flux density and radial electromagnetic force in the air gap of the PM motor are calculated by Maxwell stress method, and the spectrum analysis is performed. The structural vibration mode and harmonic response of the motor are analyzed by using the ANSYS finite element simulation software, and the relationship between the harmonic spectrum of the radial electromagnetic force of the motor and the main vibration modes (i.e., the low order vibration mode) of the motor is studied. The vibration is predicted, and the electromagnetic vibration suppression effect of the PM motor is verified.

Advantages of the Present Disclosure Include:
1. In the present disclosure, based on the Nyquist Shannon sampling theorem, the electromagnetic force modulation effect in the motor is derived, which overcomes the misconception that the low order electromagnetic force plays a decisive role in the electromagnetic vibration of the FSCW PM motor. the harmonic component of the electromagnetic force that plays a major role in the electromagnetic vibration of the PM motor is established in the present disclosure. The present disclosure provides guidance for analyzing the characteristics of electromagnetic vibration and reducing the electromagnetic vibration of PM motor.

2. In the present disclosure, an equivalent analytical model of the PM flux density is established, and the phase relationship between different PM flux density harmonics is clarified.
3. In the present disclosure, according to Maxwell stress equation, the amplitude, frequency and phase of main electromagnetic forces generated by PM flux density harmonics can be obtained. At the same time, the phase relationship between the harmonics of PM flux density and the main electromagnetic force, as well as the phase relationship between different electromagnetic force harmonics can be obtained, so as to clarify the internal relationship between the PM flux density harmonics and the main electromagnetic force.
4. In the present disclosure, according to the internal correlation between the PM flux density harmonics and electromagnetic force, the flux density harmonic is injected by reasonably designing the magnet structure, and the electromagnetic force component generated by the injected flux density harmonic offsets part of the original electromagnetic force, thereby reducing the electromagnetic vibration of the PM motor.
5. In the present disclosure, the method for reducing the electromagnetic vibration of the PM motor is universal. It is easy to be realized, and it is conducive to the engineering and practicality.

DETAILED DESCRIPTION OF THE EMBODIMENTS

In order to make the purpose, technical scheme and advantages of the present disclosure clearer, the present disclosure is further described in detail below in combination with the drawings and embodiments. It should be understood that the specific embodiments described herein are only used to explain the present disclosure and are not used to define the present disclosure.

The present disclosure takes the electromagnetic force modulation effect into account in the electromagnetic vibration analysis of the PM motor. The phase relationship between different PM flux density harmonics and between flux density harmonics and electromagnetic force are clarified. In addition, a new magnet structure for reducing the electromagnetic vibration of FSCW PM motor is proposed.

Figure 1:
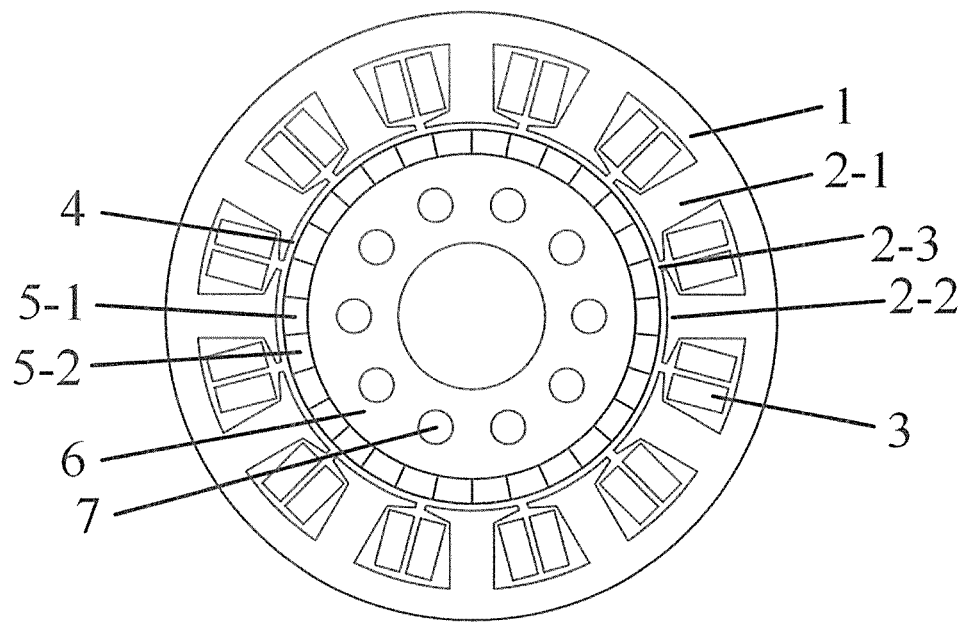
FIG. 1 shows the two-dimensional model of the new 12-slot/10-pole FSCW PM motor.

In order to more simply and clearly explain the beneficial effects of the present disclosure, a specific surface mounted permanent magnet motor is described in detail below. FIG. 1 is the topology structure of the proposed motor, in which 1 is the stator yoke, 2-1 is the stator tooth, 2-2 is the stator tooth pole shoe, 2-3 is the stator slot opening, 3 is the armature winding, 4 is the air gap between the stator and rotor, 5-1 is the segmented PM with smaller remanence, 5-2 is the segmented PM with larger remanence, 6 is the rotor core, 7 is the weight reduction hole of rotor core. The embodiment of the present disclosure is a three-phase surface mounted FSCW PM motor with 12-slots/10-poles, which consists of stator, air gap, PM and rotor core. The stator consists of stator yoke, stator tooth, stator tooth pole shoe, stator slot and armature winding. The material of the stator core is silicon steel sheet with a thickness of 0.35 mm. The armature winding topology is FSCW. The air gap is between the stator and rotor, and the air gap thickness is 1 mm; The material of the rotor core is silicon steel sheet with a thickness of 0.35 mm. The rotor is composed of PM and rotor core. The surface of the cylindrical rotor core is pasted with N42UH and N30UH PMs. The section of the surface pasted PM is approximately rectangular. Each magnet is divided into three parts. The remanence density of the N42UH magnets on both sides of each pole is higher than that of the middle N30UH magnet.

The specific implementation steps of the proposed method for reducing the electromagnetic vibration of the FSCW PM motor include, Step 1. According to Nyquist Shannon sampling theorem, the expression of electromagnetic force modulation effect of PM motor is derived. First, Fourier transform on the air gap radial force density is performed, which can be expressed as $$P_r(v) = \int_0^{2\pi} p_r(\theta, t) e^{-jv\theta} \quad (1)$$

where $p_r$ is the radial force density, v is the spatial order of the radial force density, θ is the spatial position angle, and t is the time. Since the stator tooth sampling signal is periodic, the Fourier series of the stator tooth sampling signal can be expressed as $$z(\theta) = \sum_{k=1}^{Q} \delta\left(\theta - k\frac{2\pi}{Q}\right) \quad (2)$$

where Q is the number of stator teeth, and k is a positive integer. Then Fourier decomposition of the sampled signal can be expressed as $$Z(v) = F[z(\theta)] = Q \sum_{k=1}^{Q} \delta(v - kQ) \quad (3)$$

Therefore, the output signal of the modulated radial force density can be expressed as $$p_m(\theta, t) = p_r(\theta, t) z(\theta) \quad (4)$$

According to the frequency domain convolution theorem, equation (4) can be expressed as $$P_m(v) = \frac{1}{2\pi} P_r(v) * Z(v) \quad (5)$$

Substitute equation (1) and equation (3) into equation (5), and the modulated radial force density can be expressed as $$P_m(v) = \frac{1}{2\pi}\left[Q\sum_{k=1}^{Q}\delta(v-kQ) * P_r(v)\right] \quad (6)$$

$$= \frac{Q}{2\pi}\sum_{k=1}^{Q} P_r(v-kQ)$$

According to the Nyquist Shannon sampling theorem, when the spatial order of the radial electromagnetic force is greater than half of the number of stator teeth, the spatial order of the radial electromagnetic force will change. Therefore, the modulated radial force density can be expressed as $$\begin{cases} p_m(\theta, t) = \sigma_v \cos(v\theta + \omega_v t + \varphi_v) & v \leq \frac{Q}{2} \\ p_m(\theta, t) = \sigma_v \cos((v-kQ)\theta + \omega_v t + \varphi_v) & v > \frac{Q}{2} \end{cases} \quad (7)$$

where $p_m$ is the modulated radial force density, $\sigma_v$, $\omega_v$ and $\varphi_v$ is the amplitude, angular velocity and initial phase angle of the modulated radial force density. The radial force on the stator teeth can be equivalent to a concentrated force. The modulated radial force density on the stator teeth can be expressed as $$F_{r,q}(t) = \int_{\theta_q - \frac{\Delta\theta}{2}}^{\theta_q + \frac{\Delta\theta}{2}} p_m(\theta, t) d\theta \quad (8)$$

$$= \begin{cases} \int_{\theta_q - \frac{\Delta\theta}{2}}^{\theta_q + \frac{\Delta\theta}{2}} LR_{is}[\sigma_r \cos(v\theta + \omega_v t + \varphi_v)]d\theta, & v \leq \frac{Q}{2} \\ \int_{\theta_q - \frac{\Delta\theta}{2}}^{\theta_q + \frac{\Delta\theta}{2}} LR_{is}[\sigma_r \cos((v-kQ)\theta + \omega_v t + \varphi_v)]d\theta, & v > \frac{Q}{2} \end{cases}$$

where $F_{r,q}$ is equivalent concentrated force, $\theta_q$ is the angle of the $q^{th}$ stator tooth, $\Delta\theta$ is the tooth pitch, L is the lamination length of the stator, and $R_{is}$ is the inner radius of the stator. It can be seen from equation (7) and equation (8) that due to the limitation of the number of motor stator teeth, the high order radial force acting on the stator tooth surface are modulated into the low order radial force.

Figure 2:
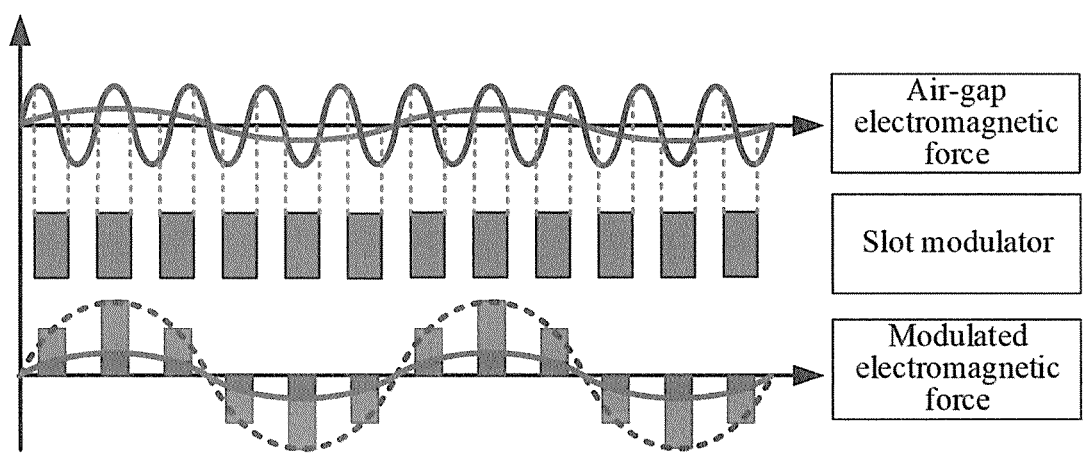
FIG. 2 shows the schematic diagram of electromagnetic force modulation process.

FIG. 2 is the modulation process of the $2^{nd}$- and $10^{th}$-order electromagnetic force harmonics of a 12-slot PM motor. The 2nd- and $10^{th}$-order electromagnetic force harmonics are uniformly and continuously distributed in the air gap. However, when the electromagnetic forces distribute on stator tooth surface, the electromagnetic force will be discretized due to the slotting effect of the motor stator. As shown in FIG. 2, after the $2^{nd}$-order radial force is modulated by 12 stator teeth, no aliasing occurs. However, when the $10^{th}$-order radial force is modulated by 12 stator teeth, it presents a $2^{nd}$-order distribution state in space.

Step 2. According to the vibration analytical model of the permanent magnet motor, the electromagnetic force component that contributes the most to the FSCW PM motor is evaluated. The stator of the motor is equivalent to a ring structure, so the electromagnetic vibration displacement of the PM motor can be expressed as $$\begin{cases} Y_{vs}(v=0) = -\frac{R_i R_y}{E h_y} \sigma_v \\ Y_{vs}(v \geq 2) = \frac{12 R_i R_y^3}{E h_y^3 (v^2-1)^2} \sigma_v \\ Y_{vd} = Y_{vs}\left[(1-\omega_v^2/\omega_m^2)^2 + 4\xi_m^2 \omega_v^2/\omega_m^2\right]^{-1/2} \end{cases} \quad (9)$$

where, $Y_{vs}$ and $Y_{vd}$ are static displacement and dynamic displacement generated by v-order radial electromagnetic force, $\sigma_v$ is the amplitude of $v^{th}$-order electromagnetic force, $R_i$ is the inner radius of the stator, $R_y$ is the average radius of the stator yoke, $h_y$ is the thickness of the stator yoke, and E is the Young's modulus of the equivalent ring, $\omega_v$ is the angular frequency of the v-order radial electromagnetic force, $\omega_m$ and $\xi_m$ is the natural frequency and damping ratio of the $m^{th}$-order mode, respectively. It can be seen from equation (9) that when the spatial order of the electromagnetic force $v \geq 2$, the vibration displacement of the equivalent cylinder is approximately inversely proportional to the fourth power of the spatial order of the electromagnetic force.

In the 12-slot/10-pole FSCW PM motor, the amplitude of the $10^{th}$-order electromagnetic force is about 25 times that of the $2^{nd}$-order electromagnetic force. According to the equivalent cylinder vibration model, their contribution to vibration can be expressed as $$\frac{Y_{vs}(v=10)}{Y_{vs}(v=2)} = \frac{(2^2-1)^2}{(10^2-1)^2} \frac{\sigma_{v=10}}{\sigma_{v=2}} = 2.3\% \quad (10)$$

Where, $\sigma_v=2$ and $\sigma_v=10$ is the amplitude of electromagnetic force of order 2 and order 10 respectively. The displacement caused by the 10th order force is only about 2.3% of the 2nd order force. Therefore, the influence of the 10th and higher order forces can be ignored. Therefore, the influence of electromagnetic force with higher spatial order on vibration is usually ignored. However, according to the conclusion of electromagnetic force modulation obtained from equation (7) and equation (8), the higher-order radial electromagnetic force can be modulated into the lower order radial electromagnetic force.

Figure 3:
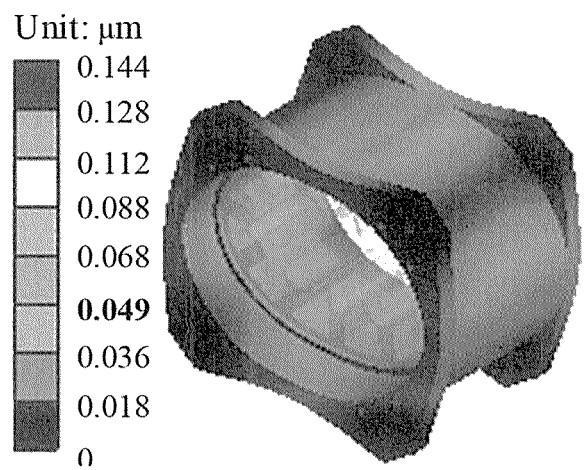
FIG. 3 shows the comparison of vibration displacement generated by the $2^{nd}$- and $10^{th}$-order radial forces; wherein, (a) of FIG. 3 shows the $2^{nd}$-order radial force, (b) of FIG. 3 shows the $10^{th}$-order radial force.
Figure 3:
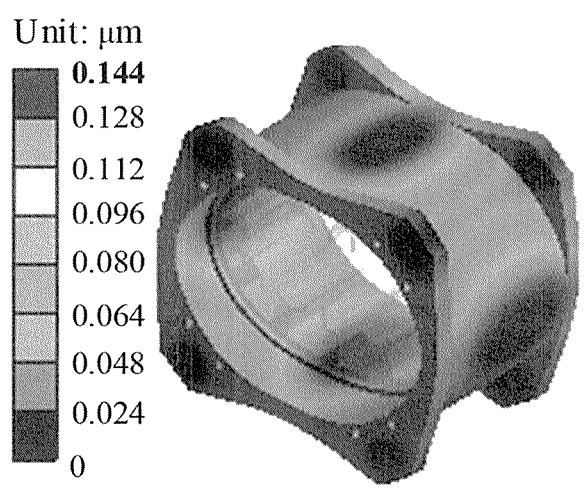

FIG. 3 compares the vibration displacement generated by the $2^{nd}$- and $10^{th}$-order electromagnetic forces of the 12-slot/10-pole FSCW PM motor. The vibration displacement generated by the second order electromagnetic force is 0.049 μm. The vibration displacement generated by the $10^{th}$-order electromagnetic force is 0.144 μm. The $10^{th}$-order electromagnetic force contributes more to the electromagnetic vibration of PM motor than the $2^{nd}$-order electromagnetic force. The pole number order (i.e., $2p^{th}$-order) electromagnetic force of FSCW PM motor has the largest amplitude, and the electromagnetic force modulation effect is of great significance to the electromagnetic vibration of PM motor.

Figure 4:
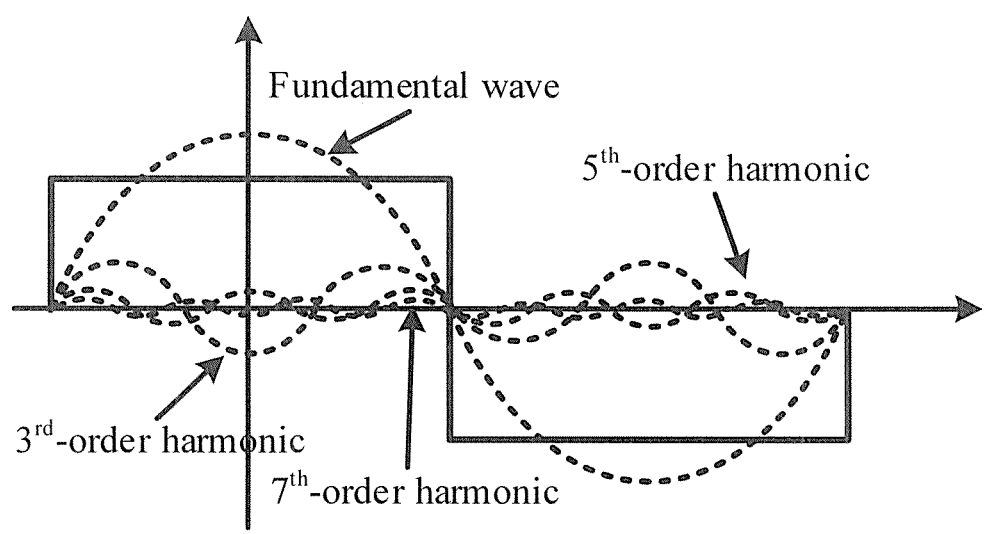
FIG. 4 shows the waveform diagram of the equivalent PM flux density.

Step 3. The equivalent model of PM flux density is established, and the phase relationship between different PM flux density harmonics is derived. In order to obtain the spatial order and corresponding initial phase angle of the PM flux density harmonics, the waveform of PM flux density can be approximately equivalent to a square wave signal, as shown in FIG. 4. The square wave signal of equivalent PM flux density can be expressed as $$B_{eq-r}(\theta) = \begin{cases} H, & 0 \le \theta \le \pi/2 \\ -H, & \pi/2 < \theta < 3\pi/2 \\ H, & 3\pi/2 \le \theta \le 2\pi \end{cases} \quad (11)$$

where, $B_{eq-r}$ is the equivalent PM flux density, H is the amplitude of the equivalent PM flux density, $\theta$ is the angular position. Since square wave signal satisfies Dirichlet condition, Fourier coefficient of the square wave signal can be expressed as $$\begin{cases} a_0 = \frac{1}{\pi}\int_{2\pi}^{0} B_{eq-r}(\theta)d\theta = 0 \\ a_n = \frac{1}{\pi}\int_{2\pi}^{0} B_{eq-r}(\theta)\cos(n\theta)d\theta = \begin{cases} \frac{4H}{n\pi}, & n = 4k-3 \\ -\frac{4H}{n\pi}, & n = 4k-1 \\ 0, & n = 2k \end{cases} \\ b_n = \frac{1}{\pi}\int_{2\pi}^{0} B_{eq-r}(\theta)\sin(n\theta)d\theta = 0 \end{cases} \quad (12)$$

where n is the spatial order of equivalent PM flux density. The spatial order and initial phase angle of the radial PM flux density harmonics can be expressed as $$B_{r-sl} = B_{r-mag} \cdot \begin{cases} \sum_{4k-3}^{\infty} \frac{1}{4k-3}\cos[(4k-3)(\theta-2\pi f_e t)] + \\ \sum_{4k-1}^{\infty} \frac{1}{4k-1}\cos[(4k-1)(\theta-2\pi f_e t) + \pi)] \end{cases} \quad (13)$$

where, $B_{r-sl}$ is the slotless radial flux density, $B_{r-mag}$ is the amplitude of the slotless radial flux density, $f_e$ is the electrical frequency and k is positive integer. Since the initial phase angle of the permanent magnet radial flux density harmonic is $\pi/2$ rad ahead of the tangential flux density harmonic, the tangential flux density harmonic can be expressed as $$B_{\tau-sl} = B_{\tau-mag} \cdot \begin{cases} \sum_{4k-3}^{\infty} \frac{1}{4k-3}\cos\left[(4k-3)(\theta-2\pi f_e t) + \frac{3\pi}{2}\right] + \\ \sum_{4k-1}^{\infty} \frac{1}{4k-1}\cos\left[(4k-1)(\theta-2\pi f_e t) + \frac{\pi}{2}\right] \end{cases} \quad (14)$$

where, $B_{\tau-sl}$ is the slotless tangential flux density, $B_{\tau-mag}$ is the amplitude of the slotless tangential flux density. The amplitude of the radial and tangential flux density harmonics is related to the geometric, electromagnetic and material parameters of the PM motor. It can be seen from equations (13) and (14) that the PM flux density only contains odd harmonics. Moreover, the initial phase difference of $(4k-3)^{th}$- and $(4k-1)^{th}$-order magnetic flux density harmonics is $\pi$ rad phase angle. In addition, the tangential flux density lags behind the radial flux density $\pi/2$ rad phase angle. The initial phase of the PM radial and tangential flux density harmonics is shown in the table below.

TABLE 1

Phase angle of different PM flux density harmonics

| Spatial order | p | 3p | 5p | 7p | ... | (4k-3)p | (4k-1)p |
|---|---|---|---|---|---|---|---|
| Radial flux density | 0 | $\pi$ | 0 | $\pi$ | | 0 | $\pi$ |
| Tangential flux density | $3\pi/2$ | $\pi/2$ | $3\pi/2$ | $\pi/2$ | | $3\pi/2$ | $\pi/2$ |

Step 4. The phase relationship between the main electromagnetic force harmonic components is obtained, and the relationship between the flux density harmonics and the $2p^{th}$-order electromagnetic force harmonics is obtained.

According to Maxwell stress tensor method, radial and tangential force density can be expressed as $$\begin{cases} p_r(\theta, t) = \frac{B_r^2(\theta, t) - B_\tau^2(\theta, t)}{2\mu_0} \approx \frac{B_r^2(\theta, t)}{2\mu_0} \\ p_\tau(\theta, t) = \frac{B_r(\theta, t) \cdot B_\tau(\theta, t)}{\mu_0} \end{cases} \quad (15)$$

Where $p_r$ and $p_\tau$ are radial and tangential forces, $B_r$ and $B_\tau$ are the radial flux density and tangential flux density, $\mu_0$ is the vacuum permeability. Since the amplitude of tangential flux density is relatively small, it is generally ignored when calculating the radial force. The air gap magnetic field of PM motor at no-load is composed of PM radial flux density and tangential flux density. The Fourier series expansion of the magnetomotive forces of radial and tangential are expressed as $$\begin{cases} F_r(\theta, t) = \sum_{v_r=1,3,5...}^{\infty} F_{r-mag}\cos(v_r p\theta - 2\pi v_r f_e t + \varphi_{v_r}) \\ F_\tau(\theta, t) = \sum_{v_\tau=1,3,5...}^{\infty} F_{\tau-mag}\cos(v_\tau p\theta - 2\pi v_\tau f_e t + \varphi_{v_\tau}) \end{cases} \quad (16)$$

where $F_r$ and $F_\tau$ are the radial and tangential magnetomotive force, $F_{r-mag}$ and $F_{\tau-mag}$ are the amplitude, $v_r$ and $v_\tau$ are the spatial order, $\varphi_{v_r}$ and $\varphi_{v_\tau}$ are the initial phase angle. Due to the influence of stator slotting, the air gap permeance is no longer a constant. The air gap permeance can be expressed by a relative permeance function, whose Fourier series can be expressed as $$\lambda(\theta) = \lambda_0 + \sum_{k=1,2,3...}^{\infty} \lambda_k \cos(kQ\theta) \quad (17)$$

Where, $\lambda$ is the air gap permeance, $\lambda_k$ is the k-order air gap permeance, $\lambda_0$ is the DC component of air gap permeance, and Q is the number of stator slots. Therefore, the radial and tangential PM flux density can be expressed as $$B_r = F_r \cdot \lambda \quad (18)$$

$$= \sum_{v_r} F_r \cos(v_r p\theta - 2\pi v_r f_e t + \varphi_r)\left[\lambda_0 + \sum_{k=1,2,3...} \lambda_k \cos(kQ\theta)\right]$$

Figure 5:
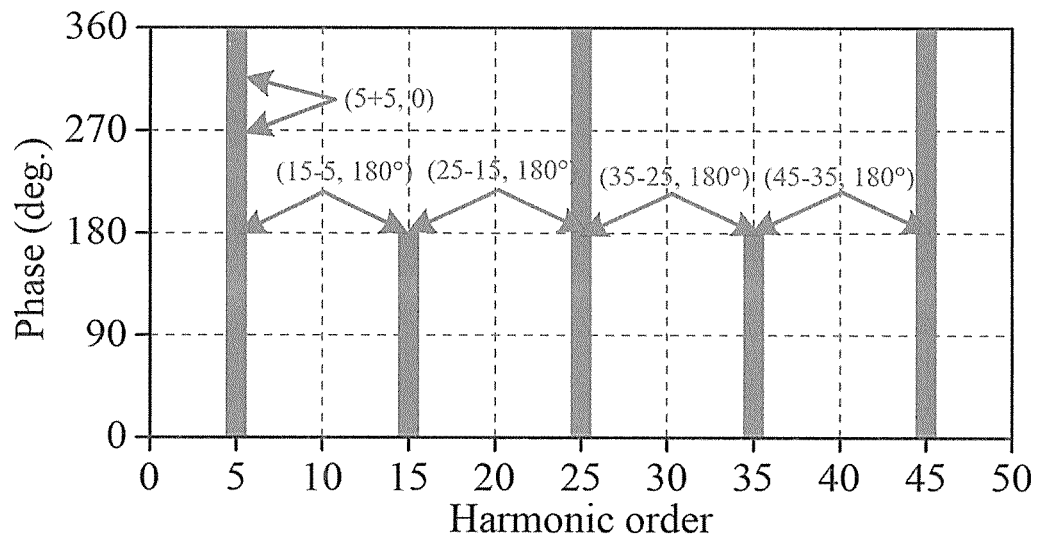
FIG. 5 shows the PM flux density and electromagnetic force phase distribution; wherein (a) of FIG. 5 shows flux density harmonics, (b) of FIG. 5 shows the $10^{th}$-order electromagnetic force harmonics.
Figure 5:
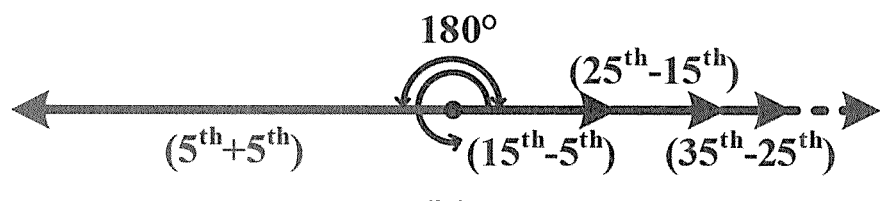

-continued $$= \sum_{v_r} B_r \cos(v_r p\theta - 2\pi v_r f_e t + \varphi_r) +$$

$$\sum_{k=1}^{\infty} \sum_{v_r} B_{rk} \cos[(v_r p \pm kQ)\theta - 2\pi v_r f_e t + \varphi_r]$$

$$B_\tau = F_\tau \cdot \lambda \quad (19)$$

$$= \sum_{v_\tau} F_\tau \cos(v_\tau p\theta - 2\pi v_\tau f_e t + \varphi_\tau) \left[\lambda_0 + \sum_{k=1,2,3...} \lambda_k \cos(kQ\theta)\right]$$

$$= \sum_{v_\tau} B_\tau \cos(v_\tau p\theta - 2\pi v_\tau f_e t + \varphi_\tau) +$$

$$\sum_{k=1}^{\infty} \sum_{v_\tau} B_{\tau k} \cos[(v_\tau p \pm kQ)\theta - 2\pi v_\tau f_e t + \varphi_\tau]$$

where $F_r$ and $F_\tau$ are the radial and tangential magnetomotive force, $v_r$ and $v_\tau$ are the spatial order, $\varphi_{vr}$ and $\varphi_{v\tau}$ are the initial phase angle, $f_e$ is the electrical frequency, p is the pole-pair number, $\lambda$ is the air gap permeance, $\lambda_k$ is the k-order air gap permeance, $\lambda_0$ is the DC component of air gap permeance, and Q is the number of stator slots. By substituting equation (18) and equation (19) into equation (15), the spatial order, frequency and initial phase of radial force and tangential force can be obtained. Both radial force harmonics and tangential force harmonics are generated by the interaction of flux density harmonics. According to the multiplication law of trigonometric function, the spatial order, frequency and initial phase of electromagnetic force harmonics are determined from the flux density harmonics. For FSCW PM motor, the phase difference between the radial force component generated by the PM flux density harmonic and by the fundamental flux density is π rad. FIG. 5 is the phase relationship between the PM flux density harmonics and the $10^{th}$-order radial electromagnetic force. Except that the initial phase of the $10^{th}$-order radial force generated by the fundamental flux density is 0, the initial phase of the $10^{th}$-order radial force generated by the flux density harmonic is π rad. The phase relationship of the $10^{th}$-order radial force generated by different PM flux density harmonics is shown in FIG. 5(b). In addition, the relationship between different PM flux density harmonics and the spatial order, frequency and phase of the $2p^{th}$-order radial and tangential electromagnetic force are shown in Table 2.

reduce the amplitude of $2p^{th}$-order radial and tangential electromagnetic force, which provides guidance for the electromagnetic vibration suppression of FSCW PM motor.

Step 5. The new magnet structure of the PM motor is designed, and the flux density harmonic content in the PM motor is used to effectively reduce the amplitude of electromagnetic force.

Figure 6:
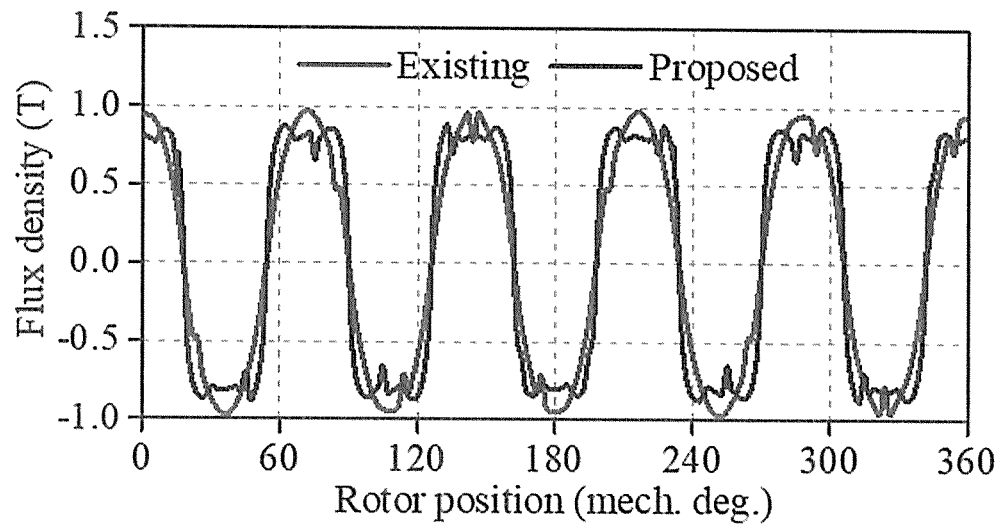
FIG. 6 shows the flux density waveform and its spectrum of PM motor; wherein (a) of FIG. 6 shows the waveform, (b) of FIG. 6 shows the spectrum.
Figure 6:
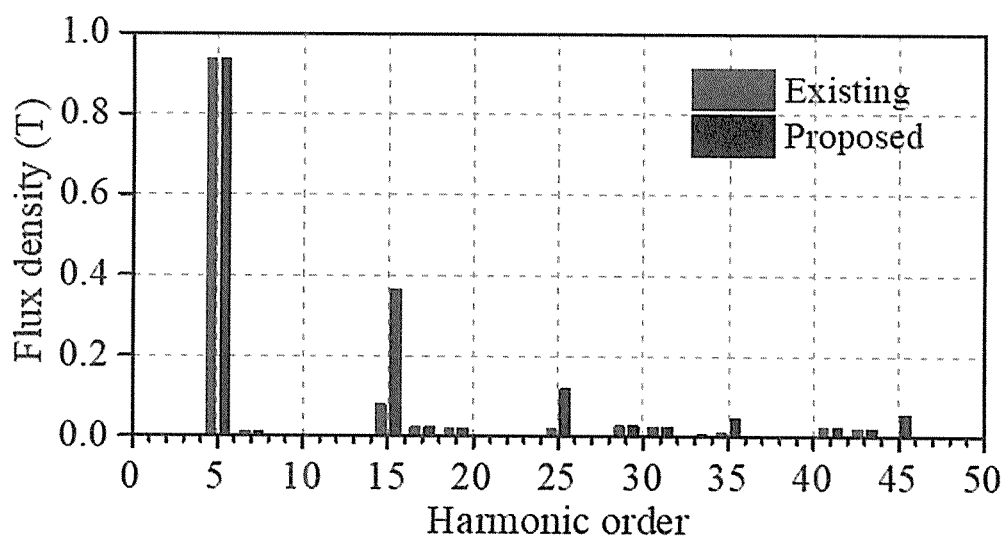
Figure 7:
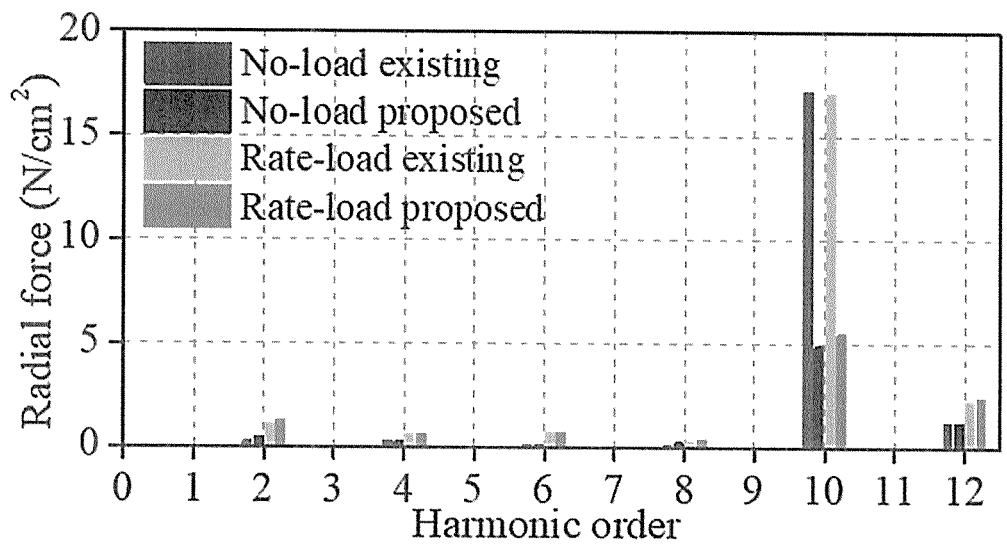
FIG. 7 shows the schematic diagram of electromagnetic force density spectrum of two PM motors; wherein (a) of FIG. 7 shows the radial force density, (b) of FIG. 7 shows the tangential force density.
Figure 7:
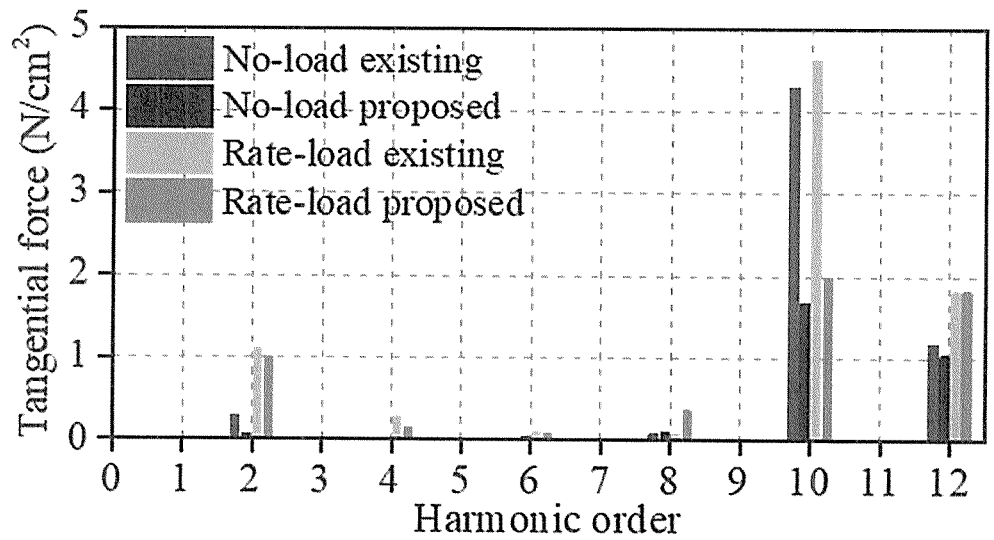

The phase relationship between the harmonics of magnetic flux density is obtained, and the relationship between the flux density harmonics and the main electromagnetic force harmonics, which can guide the low electromagnetic vibration design of PM motor. It can be seen from step 3 that for FSCW PM motor, the PM flux density harmonics are conducive to reducing the radial force and electromagnetic vibration of the PM motor. Each permanent magnet is divided into three sections, and the remanence of the permanent magnet material at both ends is higher than the remanence of the middle one, so as to achieve the effect of flux density harmonic injection. FIG. 6 is the flux density waveform and spectrum analysis of the 12-slot/10-pole PM motor with the proposed new magnet structure and with the traditional structure. The amplitude of the $15^{th}$-, $25^{th}$-, $35^{th}$- and $45^{th}$-order of flux density harmonics have been greatly increased, especially the amplitude of 15i-order flux density has increased to 0.36 T. The radial force generated by the injected PM flux density harmonic will counteract the electromagnetic force generated by the fundamental flux density. FIG. 7 shows the harmonic spectrum of radial and tangential electromagnetic forces of the 12-slot/10-pole FSCW PM motor with the traditional magnet structure and the new magnet structure under the no-load and load operation conditions of the PM motor. The amplitude of the $10^{th}$-order radial and tangential electromagnetic force of the PM motor with the new magnet structure is effectively reduced both in the no-load and load conditions, which can effectively reduce the electromagnetic vibration of the PM motor.

Step 6. The electromagnetic vibration multiple-physical fields simulation model of the PM motor is established to verify the effectiveness of electromagnetic vibration reduction by the proposed method.

In order to verify the effect of suppressing electromagnetic vibration of FSCW PM motor, two kinds of numerical software (i.e., Flux and LMS Virtual Lab Acoustics) are used in the present disclosure to carry out the simulation calculation of electromagnetic vibration of PM motor. The software Flux is an excellent electromagnetic finite element simulation software for PM motor, which has the characteristics of convenient modeling, fast simulation speed and

TABLE 2

Relationship between different PM flux density harmonics and $2p^{th}$-order radial and tangential electromagnetic force

| Radial flux density | Tangential flux density | Radial force | Tangential force |
|---|---|---|---|
| (p, $f_e$, 0) | (p, $f_e$, 3π/2) | (p + p, 2$f_e$, 0) | (p + p, 2$f_e$, 3π/2) |
| (3p, 3$f_e$, π) | (3p, 3$f_e$, π/2) | (3p − p, 2$f_e$, π) | (3p − p, 2$f_e$, π/2) |
| (5p, 5$f_e$, 0) | (5p, 5$f_e$, 3π/2) | (5p − 3p, 2$f_e$, π) | (5p − 3p, 2$f_e$, π/2) |
| (7p, 7$f_e$, π) | (7p, 7$f_e$, π/2) | (7p − 5p, 2$f_e$, π) | (7p − 5p, 2$f_e$, π/2) |
| ... | ... | ... | ... |
| ((4k−3)p, (4k−3)$f_e$, 0) | ((4k−3)p, (4k−3)$f_e$, 3π/2) | ((4k−3)p−(4k−5)p, 2$f_e$, π) | ((4k−3)p−(4k−5)p, 2$f_e$, π/2) |
| ((4k−1)p, (4k−3)$f_e$, π) | ((4k−1)p, (4k−3)$f_e$, π/2) | ((4k−1)p−(4k−3)p, 2$f_e$, π) | ((4k−1)p−(4k−3)p, 2$f_e$, π/2) |

Figure 8:
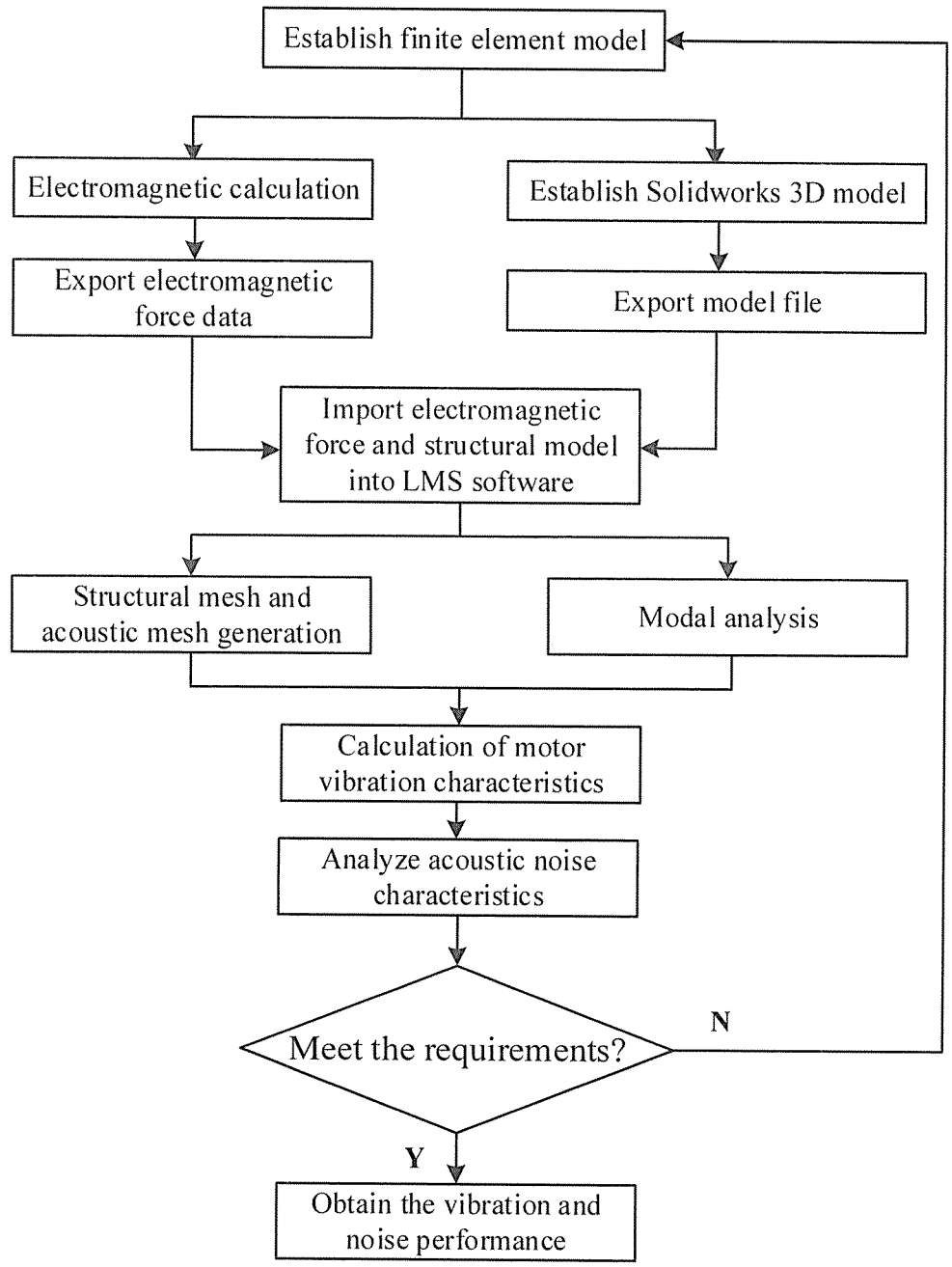
FIG. 8 shows the flowchart of electromagnetic vibration simulation of PM motor.

Base on the table, the phase difference of the $2p^{th}$-order radial and tangential electromagnetic forces generated by the harmonics and fundamental waves of the PM flux density is π rad. Therefore, the of PM flux density harmonics can good adaptive subdivision effect. The modeling efficiency and the simulation accuracy is relatively high. In addition, the calculated electromagnetic force data can be seamlessly imported into the vibration and noise simulation software LMS Virtual Lab Acoustics. LMS Virtual Lab Acoustics is a professional vibration analysis software, which can provide a variety of solutions for acoustic analysis of PM motors. It can directly use CATIA, CAD and other models, and the geometric format is completely consistent. The powerful 1D/2D/3D grid generation function makes the electromagnetic vibration analysis of the PM motor more accurate. The finite element mesh is completely parallel to the geometric parameter model. When the geometric parameters are modified, the finite element mesh can be automatically updated. The simulation calculation process is shown in FIG. 8.

The present disclosure first analyzes the radial electromagnetic force and vibration mode of the PM motor, and establishes the electromagnetic analysis and 3D structural simulation model of the PM motor. The air gap flux density and radial electromagnetic force are calculated by Maxwell stress method and the frequency spectrum analysis is performed. The structural vibration mode and harmonic response of the PM motor are calculated by using the ANSYS finite element simulation software. The relationship between the spectrums of the radial electromagnetic force and the main (low order) vibration modes of the motor is studied. The electromagnetic vibration performance is evaluated, and resonance is avoided. The calculated electromagnetic force and free vibration mode of the PM motor are introduced into the sound field simulation module to predict the noise radiation, which provides strong support for improving the design theory of low-noise high-performance PM motor system.

FIG. 9(a) shows the experimental vibration acceleration of a 12-slot/10-pole PM motor with traditional and new magnet structures under no-load conditions. The speed is 600 r/min, so the electrical frequency of the motor is 50 Hz. Since the frequency of electromagnetic force harmonic is distributed in the 2-, 4-, 6- and 8-times frequency, the vibration acceleration at these frequencies also has a large amplitude. In particular, the vibration acceleration of the traditional 12-slot/10-pole FSCW PM motor at the 2 times frequency is particularly serious. The 12-slot/10-pole FSCW PM motor of the new designed structure in the present disclosure significantly reduces the $10^{th}$-order radial force and tangential forces. At the same time, the vibration of the proposed 12-slot/10-pole FSCW PM motor is also effectively reduced.

Figure 9:
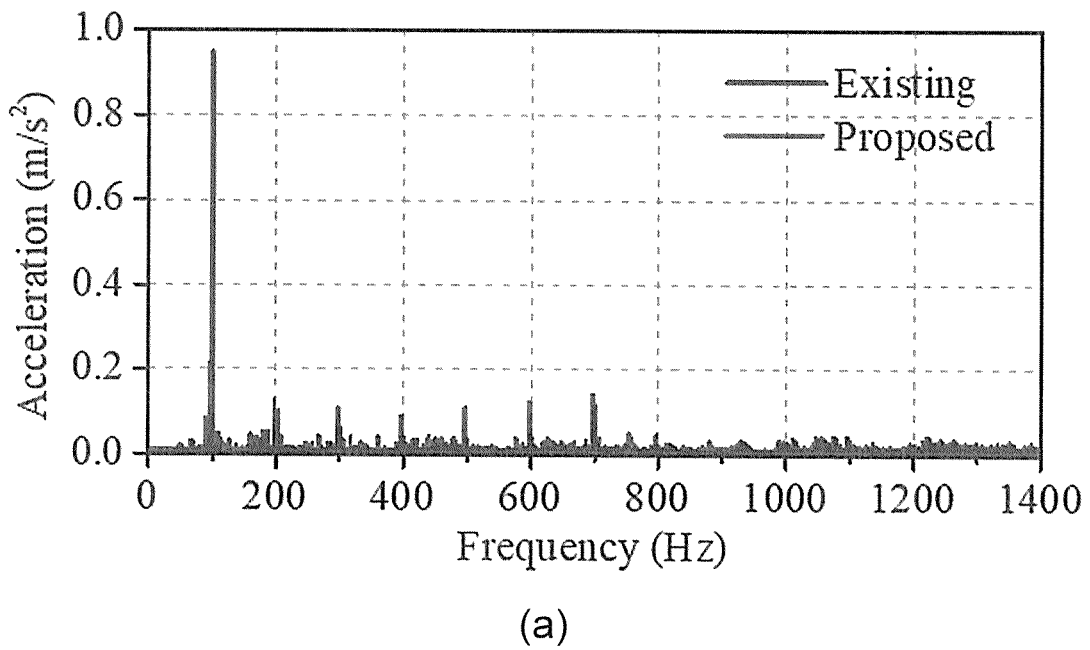
FIG. 9 shows the vibration acceleration spectrum of PM motor with traditional structure and new structure; wherein (a) of FIG. 9 is under the no-load condition, (b) of FIG. 9 is under the load condition.
Figure 9:
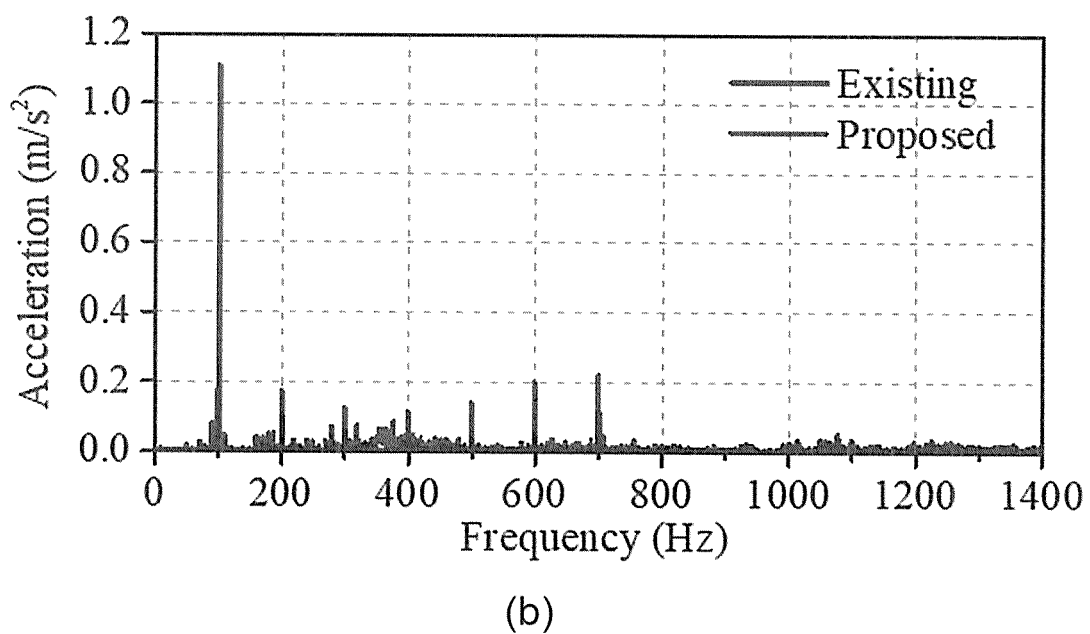

FIG. 9(b) is the experimental vibration acceleration of the 12-slot/10-pole FSCW PM motor with traditional and new designed structures under the rated load condition. Under the rated load condition, the amplitude of the $2^{nd}$-order radial force and tangential forces increase significantly due to the rich armature magnetomotive force harmonics. Therefore, the vibration acceleration of the PM motor is also increased. As shown in FIG. 9, the main vibration source of the FSCW PM motor is the $10^{th}$-order electromagnetic force, which generates a large vibration response due to the electromagnetic force modulation effect. Therefore, the flux density harmonic injection design of the new magnet structure PM motor in the present disclosure is significantly effective for vibration suppression.

What is claimed is:
1. A method for reducing electromagnetic vibration of a fractional slot concentrated winding (FSCW) permanent magnet (PM) motor, comprising:
based on Nyquist Shannon sampling theorem, deriving a mathematical expression of an electromagnetic force modulation effect of the FSCW PM motor;
evaluating a contribution of each order of an electromagnetic force to the electromagnetic vibration of the FSCW PM motor based on the mathematical expression, and identifying a harmonic component of the electromagnetic force that plays a major role in the electromagnetic vibration of the FSCW PM motor;
establishing an equivalent model of a PM flux density, and exploring a phase relationship between harmonics of different magnetic flux density;
according to Maxwell stress equation, obtaining a relationship between the flux density harmonics and a main electromagnetic force harmonic, and obtaining a phase relationship between different electromagnetic force harmonic components;
obtaining a segmented magnet structure for injecting a magnetic flux density harmonic based on the relationship between the flux density harmonics and the main electromagnetic force harmonic and the phase relationship between the different electromagnetic force harmonic components,
wherein obtaining the segmented magnet structure comprises:
identifying a magnetic flux density harmonic source of an electromagnetic force component that plays a cancellation role;
in order to achieve an effect of a flux density harmonic injection, dividing each magnet into three sections, wherein a remanence of a PM material at both ends is higher than the remanence of a middle one;
obtaining the magnetic flux density harmonic for generating an electromagnetic force, wherein the electromagnetic force is configured to counteract another electromagnetic force generated by a fundamental magnetic field for achieving an effect of reducing a synthesized radial electromagnetic force and the electromagnetic vibration; and
injecting the magnetic flux density harmonic to the FSCW PM motor to reduce an amplitude of the electromagnetic force and the electromagnetic vibration based on the segmented magnet structure.

2. The method for reducing the electromagnetic vibration of the FSCW PM motor according to claim 1, wherein
the FSCW PM motor is a three-phase surface-mounted PM motor with 12 slots and 10 poles, including a stator, an air gap, and a rotor,
the stator includes a stator yoke, stator teeth, stator teeth pole shoes, stator slots between the stator teeth, and armature windings inside the stator slots,
a material of a stator core is silicon steel and the armature windings adopt a fractional slot concentrated winding topology,
the air gap is between the stator and rotor, the rotor is evenly perforated, and a material of a rotor iron core is silicon steel,
permanent magnets are attached to a surface of the cylindrical-rotor iron core and a cross-section of the surface is rectangular, and
each magnet of the FSCW PM motor is divided into three sections, wherein a residual flux density of two of the three sections on both sides of each pole is higher than the residual flux density of a middle one of the three sections.

3. The method for reducing the electromagnetic vibration of the FSCW PM motor according to claim 1, wherein deriving the mathematical expression comprises:

performing Fourier transform on an air gap electromagnetic force harmonic, and then performing Fourier decomposition on sampled signals;

wherein an output signal of a modulated electromagnetic force is expressed as a multiplication of an electromagnetic force density and the sampled signals, and the modulated electromagnetic force is expressed by using a frequency domain convolution theorem; and wherein according to the Nyquist Shannon sampling theorem, when an electromagnetic force spatial order is greater than half of a number of stator teeth, the electromagnetic force spatial order changes, and a higher-order electromagnetic force harmonic is modulated into a lower order electromagnetic force component.

4. The method for reducing the electromagnetic vibration of the FSCW PM motor according to claim 1, wherein evaluating the contribution of each order of the electromagnetic force comprises:

wherein a stator of the FSCW PM motor is equivalent to a cylinder structure, and obtaining a mathematical relationship between a vibration displacement and an electromagnetic force spatial order of the FSCW PM motor;

wherein when the electromagnetic force spatial order $v \geq 2$, the vibration displacement of an equivalent cylinder is approximately inversely proportional to a fourth power of the electromagnetic force spatial order;

wherein an influence of the electromagnetic force with a high spatial order on the electromagnetic vibration is ignored;

wherein high order electromagnetic force harmonics are modulated into low order electromagnetic force harmonics; and wherein contributions of different electromagnetic force harmonics to the electromagnetic vibration of the FSCW PM motor are evaluated and compared.

5. The method for reducing the electromagnetic vibration of the FSCW PM motor according to claim 1, wherein establishing the equivalent model comprises:

wherein a PM flux density waveform is equivalent to a square wave signal, and a spatial order and a corresponding initial phase of the flux density harmonics are obtained;

wherein the square wave signal satisfies Dirichlet condition, and a Fourier coefficient of the square wave signal is obtained;

wherein a spatial order of a PM radial flux density harmonic, and a corresponding initial phase angle, as well as the phase relationship between each flux density harmonic are obtained; and wherein an initial phase angle of the PM radial flux density harmonic is $\pi/2$ rad ahead of a tangential flux density harmonic, and a spatial order and an initial phase angle of a PM tangential flux density harmonic are obtained.

6. The method for reducing the electromagnetic vibration of the FSCW PM motor according to claim 1, obtaining the relationship between the flux density harmonics and obtaining the main electromagnetic force harmonic and obtaining the phase relationship between the different electromagnetic force harmonic components comprises:

obtaining a phase relationship between harmonic components of a main electromagnetic force and obtaining a mapping relationship between harmonic components of the magnetic flux density and harmonic components of the main electromagnetic force;

according to Maxwell stress tensor method, obtaining a mathematical relationship between radial and tangential electromagnetic forces and radial and tangential magnetic flux density, wherein a magnetic flux density is a function of time and space, and electromagnetic force harmonics of each order also have a specific spatial order, time frequency and initial phase angle, and wherein the electromagnetic force harmonics with a same spatial order and time frequency have different initial phase angles, and a superposition or cancellation effect between the electromagnetic force harmonics exists;

obtaining each order of magnetic flux density harmonics as a function of the spatial order, the time frequency and the initial phase angles; and according to Maxwell tensor method, obtaining a mapping relationship between the magnetic flux density harmonics and the main electromagnetic force harmonic, and the phase relationship between the electromagnetic force harmonic components.

7. The method for reducing the electromagnetic vibration of the FSCW PM motor according to claim 1, further comprising:

establishing a multi-physical field electromagnetic vibration simulation model for verifying an electromagnetic vibration suppression effect of the FSCW PM motor, wherein establishing the multi-physical field electromagnetic vibration simulation model comprises:

using two numerical software, Flux and LMS Virtual Lab Acoustics, to simulate the electromagnetic vibration and a noise of the FSCW PM motor;

setting optimized parameters of the FSCW PM motor in the Flux, which is an electromagnetic finite element simulation software, and exporting force vector data of the FSCW PM motor;

connecting the force vector data to the LMS Virtual Lab Acoustics, which is a vibration simulation software;

establishing electromagnetic analysis and three-dimensional structural dynamics simulation models of the FSCW PM motor, and analyzing the electromagnetic force and a vibration mode of the FSCW PM motor;

analyzing a structural vibration mode and a harmonic response of the FSCW PM motor, and analyzing a relationship between radial electromagnetic force spectrum components and low order vibration modes of the FSCW PM motor; and simulating a vibration performance of the FSCW PM motor, and verifying the electromagnetic vibration suppression effect of the FSCW PM motor.

* * * * *